(12) United States Patent
Patel et al.

(10) Patent No.: US 7,282,886 B1
(45) Date of Patent: Oct. 16, 2007

(54) METHOD AND SYSTEM FOR CONTROLLING PERMANENT MAGNET MOTOR DRIVE SYSTEMS

(75) Inventors: Nitinkumar R. Patel, Cypress, CA (US); Bon-Ho Bae, Torrance, CA (US); James M. Nagashima, Cerritos, CA (US); Tae-Suk Kwon, Sujieup Yongin (KR); Seung Ki Sul, Seoul (KR)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/462,596

(22) Filed: Aug. 4, 2006

(51) Int. Cl.
*H02P 1/24* (2006.01)
*H02P 5/28* (2006.01)
*H02P 7/00* (2006.01)

(52) U.S. Cl. ............... 318/721; 318/717; 318/727; 318/807

(58) Field of Classification Search ........... 318/432, 318/434, 701, 721, 727, 717, 801, 807
See application file for complete search history.

(56) References Cited

U.S. PATENT DOCUMENTS

| | | | | |
|---|---|---|---|---|
| 5,923,728 A | * | 7/1999 | Ikkai et al. ............ | 318/807 |
| 5,936,378 A | * | 8/1999 | Iijima et al. ........... | 318/807 |
| 5,994,870 A | * | 11/1999 | Kaneko et al. ......... | 318/798 |
| 6,407,631 B2 | * | 6/2002 | Yamashita ............. | 330/69 |
| 6,427,105 B1 | * | 7/2002 | Matsushita ............ | 701/41 |
| 6,741,060 B2 | * | 5/2004 | Krefta et al. .......... | 318/727 |
| 6,774,592 B2 | * | 8/2004 | Walters et al. ......... | 318/254 |
| 6,801,011 B2 | * | 10/2004 | Ide ..................... | 318/700 |
| 6,861,813 B2 | * | 3/2005 | Yoshimoto et al. .... | 318/432 |
| 6,876,169 B2 | * | 4/2005 | Gallegos-Lopez et al. | 318/701 |
| 2002/0145837 A1 | * | 10/2002 | Krefta et al. .......... | 361/23 |
| 2003/0090231 A1 | * | 5/2003 | Yoshimoto et al. .... | 318/635 |
| 2004/0070362 A1 | * | 4/2004 | Patel et al. ............ | 318/701 |
| 2004/0113582 A1 | * | 6/2004 | Ide ..................... | 318/717 |
| 2004/0135538 A1 | * | 7/2004 | Gallegos-Lopez et al. | 318/807 |

* cited by examiner

*Primary Examiner*—Paul Ip

(57) ABSTRACT

Methods and system are provided for controlling permanent magnet motor drive systems. The method comprises the steps of adjusting a first current command in response to a first voltage error to produce a first adjusted current, adjusting a second current command in response to a second voltage error to produce a second adjusted current, limiting each of the first and second adjusted current below a maximum current, converting the first adjusted current to a first potential, converting the second current command to a second potential, and supplying the first and second potentials to the permanent magnet motor. The first voltage error is derived from the second current command, and the second voltage error is derived from the first current command.

20 Claims, 3 Drawing Sheets

— · — METHOD 1    — — — PROPOSED METHOD
········ METHOD 2    — ·· — SIX STEP

— · — METHOD 1    — — — PROPOSED METHOD
········ METHOD 2    — ·· — SIX STEP

——— METHOD 1    — — — PROPOSED METHOD
········ METHOD 2    — ·· — SIX STEP

METHOD AND SYSTEM FOR CONTROLLING PERMANENT MAGNET MOTOR DRIVE SYSTEMS

BACKGROUND OF THE INVENTION

Technical Field

The present invention generally relates to controlling alternating current (AC) motors, and more particularly relates to systems and methods for controlling synchronous permanent magnet motors.

AC motors are used in a variety of applications, including vehicle applications, and AC induction motors are desirable for having a simple, rugged construction, easy maintenance, and cost-effective pricing. The AC motors used in vehicle applications are typically controlled (e.g., via voltage source inverter) such that the motor phase currents are sinusoidal. Supplying a sinusoidally-shaped input current to the AC motor typically produces the highest average torque without additional low-frequency harmonics which can be a source of torque pulsations in the AC motors.

In electric vehicle (EV)/fuel cell electric vehicle (FCEV)/hybrid electric vehicle (HEV) propulsion applications, one design consideration is to maximize the utilization of available DC bus voltage. Using a propulsion drive system based on an induction machine, a six step switching operation is commonly implemented to utilize the DC bus voltage during high speed range operations. The six step operation is typically simple to implement with the induction machine due to the presence of slip (i.e., the difference between the rotor frequency and the stator frequency). For example, the slip may be controlled by controlling the phase of the stator voltages.

Some AC motors are permanent magnet motors designed to have a sinusoidally-shaped back electromagnetic field (EMF) waveform. Synchronous permanent magnet motors (SPMM) typically have high power density and high efficiency characteristics and are thus well-suited for EV/FCEV/HEV propulsion applications. The concept of slip does not apply to SPMM drive systems because SPMMs lack a measurable slip. Additionally, the magnitude of the stator current is sensitive to the absolute stator voltage phase with respect to the rotor angle, and thus implementing a six step control for SPMMs is complex. Six step control algorithms typically have complicated transition algorithms between the conventional vector control algorithm and the six step control algorithm. These transitions algorithms add further complexity to implementing the six step control for SPMMs.

Accordingly, it is desirable to provide a method for controlling permanent magnet motor drive systems. More particularly, it is desirable to provide a method for controlling SPMM drive systems that optionally utilizes the DC bus voltage while retaining stator current control. Additionally, it is desirable to provide a control system for permanent magnet motor drive systems. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and system are provided for controlling a permanent magnet motor. In an exemplary embodiment, a method is provided for controlling a permanent magnet motor comprising the steps of adjusting a first current command in response to a voltage error to produce a first adjusted current, limiting each of the first adjusted current and the second current command below a maximum current, converting the first adjusted current to a first potential, converting the second current command to a second potential, and supplying the first and second potentials to the permanent magnet motor. The voltage error is derived from a second current command during a voltage saturation of the permanent magnet motor.

In another exemplary embodiment, a method is provided for controlling a permanent magnet motor comprising the steps of adjusting a first current command in response to a first voltage error to produce a first adjusted current, adjusting the second current command in response to a second voltage error to produce a second adjusted current, limiting each of the first adjusted current and the second adjusted current below a maximum current, converting the first adjusted current to a first potential, converting the second adjusted current to a second potential, and supplying the first and second potentials to the permanent magnet motor. The first voltage error is derived from a second current command during a voltage saturation of the permanent magnet motor. The second voltage error is derived from the first current command during the voltage saturation of the permanent magnet motor.

A control system is provided for regulating an input voltage to a permanent magnet motor having a saturation current. The controller comprises a first current compensation module, a second current compensation module, and a transformation module. The first current compensation module is configured to subtract a first error from a first current command to produce a first adjusted current, and limit the first adjusted current to a first maximum current to produce a first limited current. The second current compensation module is configured to limit a second current command to a second module current to produce a second limited current. The second maximum current is derived from the first maximum current and the saturation current. The transformation module is coupled to the first and second current compensation modules for converting the first limited current to a first input voltage and for converting the second limited current to a second input voltage. The first error is produced while converting the second limited current to said second input voltage.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
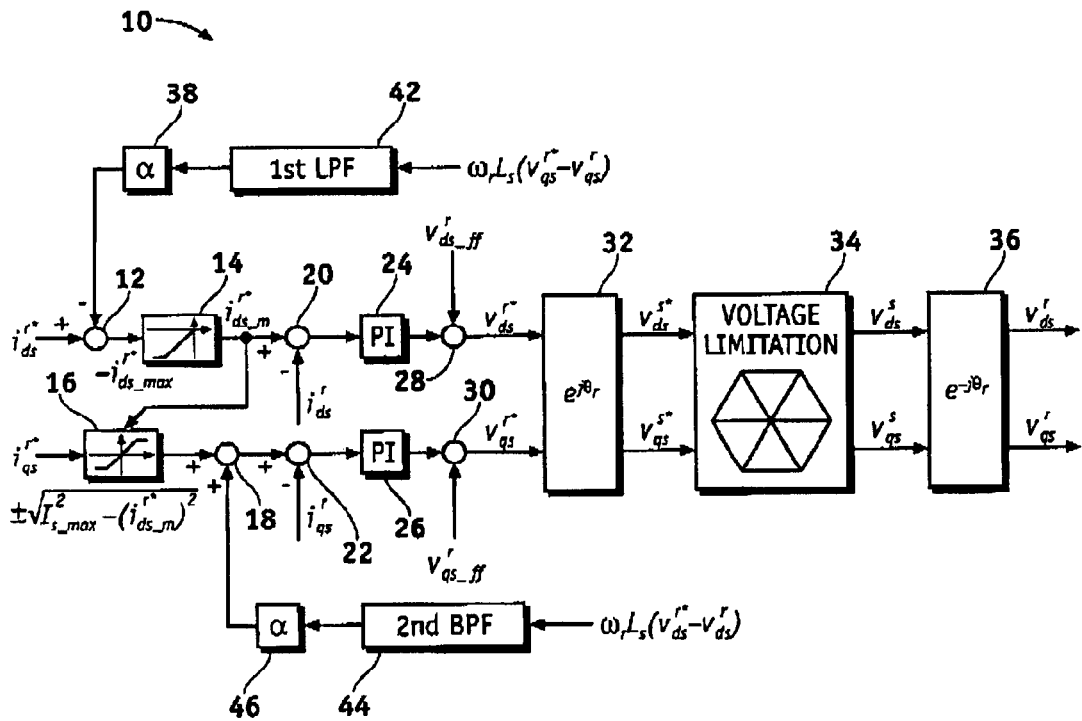
FIG. 1 is a block diagram of a control system for a permanent magnet motor in accordance with an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention is a control system and method for controlling permanent magnet motor based drive systems. In general, the control system comprises a d-axis current compensation module, a q-axis current compensation module, and a transformation module coupled to both of the current compensation modules. The d-axis current compensation module modifies a d-axis current reference to minimize a voltage saturation error, and this modification is based in part on a voltage limitation applied to the q-axis reference frame voltage command. The q-axis current compensation module may also be configured to modify the q-axis current reference to minimize the voltage saturation error, and this modification is based in part on a voltage limitation applied to the d-axis reference frame voltage command. Additionally, the current references (e.g., d- and q-axis) are limited, by the respective current compensation module, to prevent the magnitudes of the current references from exceeding a predetermined maximum current magnitude. The transformation module converts the modified current references to corresponding voltage references which are supplied to a permanent magnet motor.

The voltage equation for a synchronous permanent magnet motor (SPMM) is as follows:

$$v_{ds}^r = R_s i_{ds}^r + L_d \frac{d i_{ds}^r}{dt} - \omega_r L_q i_{qs}^r \qquad (1)$$

$$v_{qs}^r = R_s i_{qs}^r + L_q \frac{d i_{qs}^r}{dt} + \omega_r (L_d i_{ds}^r + \lambda_f)$$

where $R_s$ is the SPMM per phase resistance, $L_d$ is the d-axis inductance, $\omega_r$ is the rotor speed of the SPMM $L_q$ is the q-axis inductance, $\lambda_f$ is the flux linkage of the permanent magnet, i is the current and v is the voltage. The meanings of subscription and superscription are as follows:

Subscript a, b and c: Quantity in the phase a, b, and c, respectively;
Subscript d and q: Quantity in the d- and q-frames, respectively;
Subscript s: Quantity of stator windings;
Superscript s: Quantity in the stationary frame;
Superscript r: Quantity in the synchronous (rotating) reference frame; and
Superscript *: Quantity which is command.

Assuming that the actual d- and q-axis currents are tracking the commanded value, the voltage error ($\Delta v_{ds}^r$, $\Delta v_{qs}^r$) produced during voltage saturation can be expressed as:

$$\Delta v_{ds}^r = -\omega_r L_q i_{qs}^r - v_{ds,Lmt}^r$$

$$\Delta v_{qs}^r = \omega_r(L_d i_{ds}^r + \lambda_f) - v_{qs,Lmt}^r \qquad (2)$$

The error function for a gradient descent method is defined as $$J = \frac{1}{2}(\Delta v_{ds}^{r2} + \Delta v_{qs}^{r2}) \qquad (3)$$

$$= \frac{1}{2}((-\omega_r L_q i_{qs}^r - v_{ds,Limit}^r)^2 + (\omega_r(L_d i_{ds}^r + \lambda_f) - v_{qs,Limit}^r)^2)$$

Using the gradient descent method, the d- and q-axis current for minimizing the error function is determined from a partial derivation of the error function $$\nabla J = \begin{bmatrix} \frac{1}{2} \frac{\partial (\omega_r(L_d i_{ds}^r + \lambda_f) - v_{qs,Limit}^r)^2}{\partial i_{ds}^r} \\ \frac{1}{2} \frac{\partial (-\omega_r L_q i_{qs}^r - v_{ds,Limit}^r)^2}{\partial i_{qs}^r} \end{bmatrix} \qquad (4)$$

$$= \begin{bmatrix} \omega_r L_d(\omega_r(L_d i_{ds}^r + \lambda_f) - v_{qs,Limit}^r) \\ -\omega_r L_q(\omega_r L_q i_{qs}^r - v_{ds,Limit}^r) \end{bmatrix} = \begin{bmatrix} \omega_r L_d \Delta v_{qs}^r \\ -\omega_r L_q \Delta v_{ds}^r \end{bmatrix}$$

$$\frac{d}{dt}\begin{bmatrix} i_{ds\_controller}^r \\ i_{qs\_controller}^r \end{bmatrix} = -\alpha \nabla J \qquad (5)$$

$$\begin{bmatrix} i_{ds\_controller}^r \\ i_{qs\_controller}^r \end{bmatrix} = \frac{\alpha}{s}\begin{bmatrix} -\omega_r L_d \Delta v_{qs}^r \\ \omega_r L_q \Delta v_{ds}^r \end{bmatrix} \qquad (6)$$

where $\alpha$ is a control gain for determining the convergence speed.

In order to avoid offset error contributions, the integrator is replaced by a low pass filter and a band pass filter.

$$\begin{bmatrix} i_{ds\_controller}^r \\ i_{qs\_controller}^r \end{bmatrix} = \alpha \begin{bmatrix} \frac{\omega}{s+\omega}(-\omega_r L_d \Delta v_{qs}^r) \\ \frac{\omega_L}{s+\omega_L}\frac{s}{s+\omega_H}(\omega_r L_q \Delta v_{ds}^r) \end{bmatrix} \qquad (7)$$

The control inputs to the d- and q-axis references are as follows:

$$i_{ds\_controller}^r = \frac{\alpha \omega_L}{s+\omega_L}(-\omega_r L_s \Delta v_{qs}^r) \qquad (8)$$

$$i_{qs\_controller}^r = \frac{s\omega_L}{s+\omega_L}\frac{\alpha}{s+\omega_H}(\omega_r L_s \Delta v_{ds}^r). \qquad (9)$$

The d- and q-axis current references are modified as $$i_{ds\_m}^{r*} = i_{ds}^{r*} + i_{ds\_controller}^r = i_{ds}^{r*} - \frac{\alpha \omega}{s+\omega}(\omega_r L_s \Delta v_{qs}^r) \qquad (10)$$

$$i_{qs\_m}^{r*} = i_{qs}^{r*} + i_{qs\_controller}^r = i_{qs}^{r*} + \frac{s\omega_L}{s+\omega_L}\frac{\alpha}{s+\omega_H}(\omega_r L_s \Delta v_{ds}^r). \qquad (11)$$

In addition to this controller algorithm, the current magnitude for the q-axis current is limited within a maximum value during operation of the control system or algorithm. This function maximizes the current utilization without exceeding the rating of the inverter and the motor.

In order to prevent the current magnitude from exceeding a predetermined maximum current magnitude $I_{s\_max}$, the limit value for the q-axis current is as follows:

$$i^{r*}_{qs\_limited} = \pm \sqrt{I^2_{s\_max} - (i^{r*}_{ds\_m})^2}. \quad (12)$$

Referring to FIG. 1, a control system 10 is shown for a permanent magnet motor (not shown) in accordance with an exemplary embodiment of the present invention. The control system 10 receives synchronous reference frame current commands ($i^{r*}_{ds}$, $i^{r*}_{qs}$) and comprises a first summer 12, a first current limiter 14 coupled to the summer 12, a second current limiter 16, a second summer 18 coupled to the second current limiter 16, a third summer 20 coupled to the first current limiter 14, a fourth summer 22 coupled to the summer 18, first and second synchronous frame proportional-integral (PI) current regulators 24 and 26 coupled to the third and fourth summers 20 and 22, respectively, fifth and sixth summers 28 and 30 coupled to the PI current regulators 24 and 26, respectively, a synchronous to stationary reference frame transformation block 32 coupled to the fifth and sixth summers 28 and 30, a voltage limiter 34 coupled to the transformation block 32, a stationary to synchronous reference frame transformation block 36 coupled to the voltage limiter 34, a low pass filter 42, a gain module 38 having an input coupled to the low pass filter 42 and having an output coupled to the summer 12, a band pass filter 44, and a gain module 46 having an input coupled to the band pass filter 44 and having an output coupled to the summer 18. One or more of the components of the control system 10 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components, or a combination thereof.

The summers 12 and 20, gain module 38, low pass filter 42, and current limiter 14 together form the d-axis current compensation module. As used herein, The term "module" refers to an ASIC, an electronic circuit, a processor (shared, dedicated, or group) and memory that execute one or more software or firmware programs, a combinational logic circuit, and/or other suitable components that provide the described functionality. The low pass filter 42 filters a signal, $\omega_r L_s (v^s_{qs} - v^r_{qs})$, where a q-axis synchronous reference frame voltage command ($v^{r*}_{qs}$) is sampled from the summer 30 and a measured q-axis synchronous reference frame voltage ($v^r_{qs}$) is sampled from transformation block 36. The control gain ($\alpha$) is subsequently applied to the filtered signal at the gain module 38 to produce a compensation current, and the summer 12 modifies the d-axis current reference ($i^{r*}_{ds}$) by this compensation current. The current limiter 14 limits the magnitude of the resulting current between a minimum d-axis current ($-i^{r*}_{ds\_max}$) and zero to produce a modified d-axis current reference ($i^{r*}_{ds\_m}$). The summer 20 compares the modified d-axis current reference ($i^{r*}_{ds\_m}$) with a measured d-axis current ($i^r_{ds}$) to produce an error signal which is supplied to the synchronous frame PI current regulator 24.

The current limiter 16, summers 18 and 22, gain module 46, and band pass filter 44 together form the q-axis current compensation module. The band pass filter 44 filters a signal $\omega_r L_s (v^{r*}_{ds} - v^r_{ds})$, where a d-axis synchronous rotating reference frame voltage command ($v^{r*}_{ds}$) is sampled from the summer block 28 and a measured d-axis synchronous rotating reference frame voltage ($v^r_{ds}$) is sampled from the transformation block 36. The control gain ($\alpha$) is subsequently applied to the filter signal at the gain module 46 to produce a compensation current, and the summer 18 modifies the q-axis current reference ($i^{r*}_{qs}$) by this compensation current. The current limiter 16 limits the magnitude of the resulting current within a maximum q-axis current $$\pm \sqrt{I^2_{s\_max} - (i^{r*}_{ds\_m})^2}$$

to produce a modified q-axis current reference ($i^{r*}_{qs\_m}$). The summer 22 compares the modified q-axis current reference ($i^{r*}_{qs\_m}$) with a measured q-axis current ($i^r_{qs}$) to produce an error signal.

Figure 2:
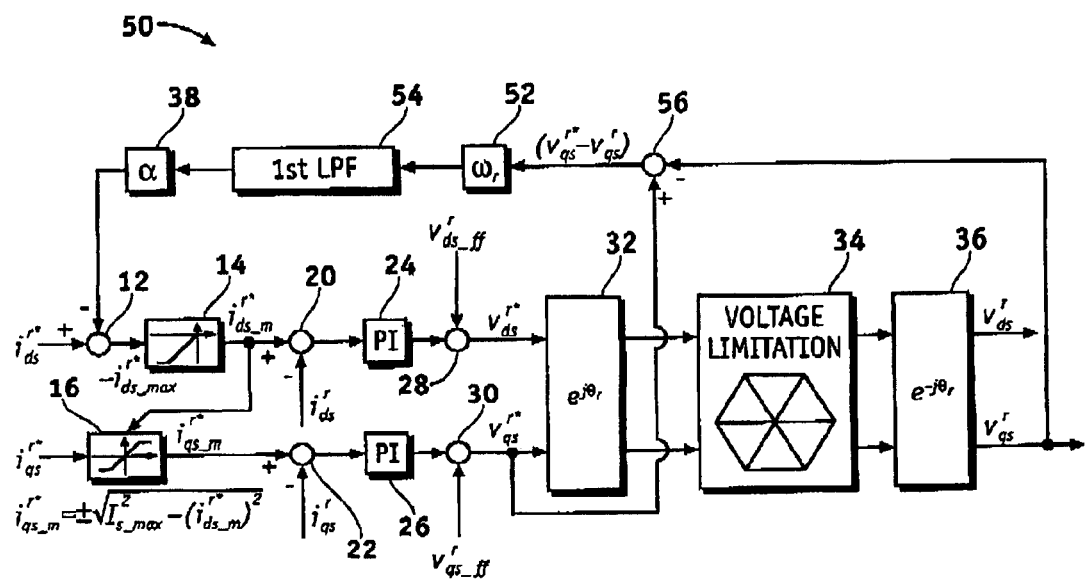
FIG. 2 is a block diagram of a control system for a permanent motor in accordance with another exemplary embodiment of the present invention.

The PI current regulators 24, 26, summers 28 and 30, transformation blocks 32 and 36, and the voltage limiter 34 together form the transformation module. The error signals from the summers 20 and 22 are supplied to the PI current regulators 24, 26, respectively, and the summers 28 and 30 add feedforward voltage references ($v^r_{ds\_ff}$, $v^r_{qs\_ff}$) to produce d- and q-axis synchronous rotating reference frame voltage commands ($v^{r*}_{ds}$, $v^{r*}_{qs}$), respectively. The transformation block 32 converts the synchronous rotating reference frame voltage commands ($v^{r*}_{ds}$, $v^{r*}_{qs}$) to stationary reference frame voltage commands which are supplied to the voltage limiter 34. The voltage limiter 34 may implement a variety of voltage control techniques (e.g., pulse width modulation (PWM)) on the stationary reference frame voltage commands ($v^{s*}_{ds}$, $v^{s*}_{qs}$) and outputs measured stationary reference frame voltages ($v^s_{ds}$, $v^s_{qs}$), respectively. The transformation block 36 converts the measured stationary reference frame voltages ($v^s_{ds}$, $v^s_{qs}$) to measured synchronous reference frame voltages ($v^r_{ds}$, $v^r_{qs}$), respectively, a 2-to-3 transformation block (not shown) may be used to convert the two-phase voltage components (e.g., $v^s_{ds}$, $v^s_{qs}$) to three-phase voltage components FIG. 2 is a block diagram of a control system 50 for a permanent motor in accordance with another exemplary embodiment of the present invention. In this exemplary embodiment, the d-axis current compensation module comprises the summers 12 and 20, the current limiter 14, a summer 56, a rotor speed module 52 coupled to the summer 56, a low pass filter 54 coupled to the rotor speed module 52, and the gain module 38. The q-axis current is limited within the maximum q-axis current $$\pm \sqrt{I^2_{s\_max} - (i^{r*}_{ds\_m})^2}$$

but not modified by the q-axis current compensation module (e.g., by the signal $\omega_r L_s (v^{r*}_{ds} - v^r_{ds})$).

As previously mentioned with regard to the control system 10 shown in FIG. 1, the q-axis synchronous rotating reference frame voltage command ($v^{r*}_{qs}$) is sampled from the summer block 30 and the measured q-axis synchronous rotating reference frame voltage ($v^r_{qs}$) is sampled from the transformation 36. The summer 56 compares the q-axis synchronous rotating reference frame voltage command ($v^{r*}_{qs}$) with the measured q-axis synchronous rotating reference frame voltage ($v^r_{qs}$) to produce a voltage error. The rotor speed module 52 applies the rotor speed ($\omega_r$) to this voltage error, the low pass filter 54 filters the voltage error, and the gain module 38 applies the control gain ($\alpha$) to the filtered signal to produce a compensation current.

Figure 3:
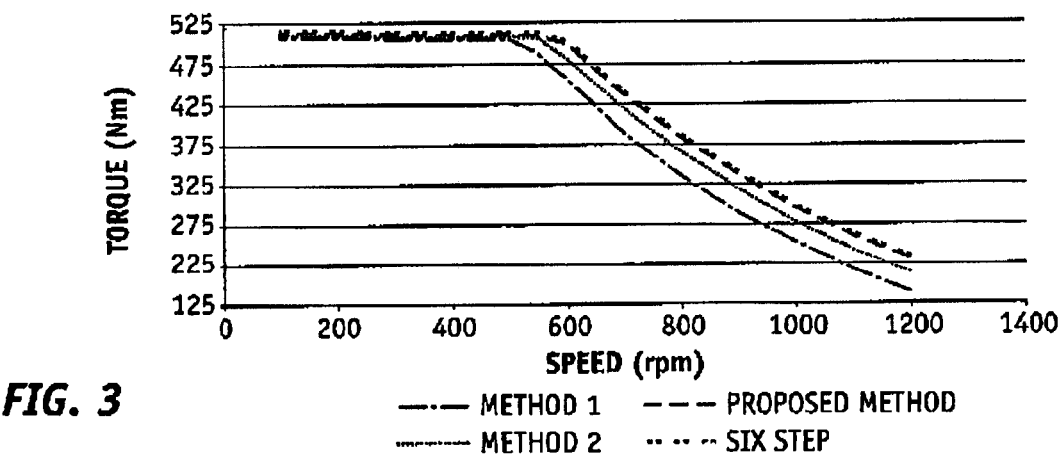
FIG. 3 is a graph illustrating peak torques useful in explaining the operation of the control system of the present invention.
Figure 4:
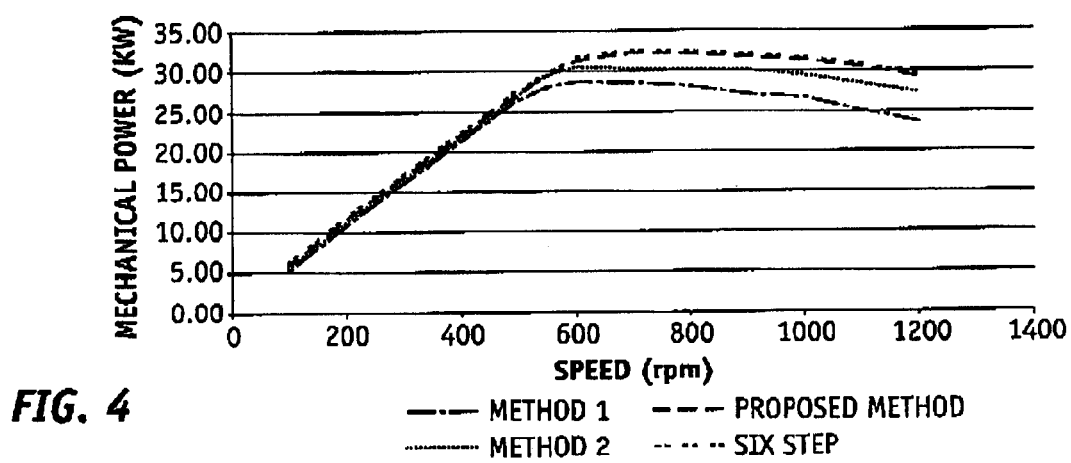
FIG. 4 is a graph illustrating peak powers useful in explaining the operation of the control system of the present invention.
Figure 5:
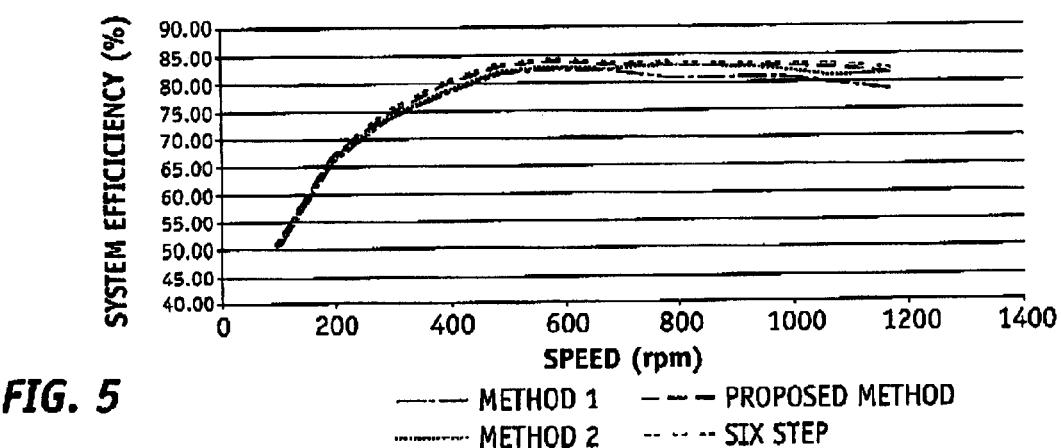
FIG. 5 is a graph illustrating system efficiencies useful in explaining the operation of the control system of the present invention.

FIG. 3 is a graph illustrating peak torque curves useful in explaining the operation of the control systems 10, 50 shown in FIGS. 1 and 2, respectively. FIG. 4 is a graph illustrating peak power curves useful in explaining the operation of the control systems 10, 50 shown in FIGS. 1 and 2, respectively. FIG. 5 is a graph illustrating system efficiency curves useful in explaining the operation of the control systems 10, 50 shown in FIGS. 1 and 2, respectively. The control systems of the present invention ("proposed method") were tested using a 25 kW axial flux SPMM wheel hub motor and compared with the following control methods. "Method 1", a current control up to a linear region limit, "Method 2", a current control up to about 97% of a six step voltage limit, and, a six step operation ("Six Step"). Methods 1 and 2 use conventional synchronous current regulator with anti-wind-up. In case of methods 1 and 2, field-weakening control modifies the current reference to limit the voltage magnitude at about 90% and about 97% of the six step voltage limit, respectively. As shown in FIG. 3, the peak torque generated by the control systems of the present invention and the six step control method are almost similar for all of the tested speed cases. As shown in FIG. 4, the peak power generated by the control systems of the preset invention is greater than the peak powers generated using Methods 1 and 2. Additionally, the peak power generated by the control systems of the present invention is substantially similar to the peak power generated with the six step control method. As shown in FIG. 5, the system efficiency of the control systems of the present invention is almost similar as the six step control method. At higher speeds, the system efficiency resulting from the control systems of the present invention is slightly greater when compared to the six step control method indicating lower harmonic losses with the control systems of the present invention. Thus, the control systems of the present invention provide a similar level of performance as the six step control method while having the benefits of a vector type control method, such as high system efficiency, retention of current control under operating conditions, lack of a transition algorithm, fast transient performance, lower space harmonic generation, lower audible noise, and simple implementation.

Figure 6:
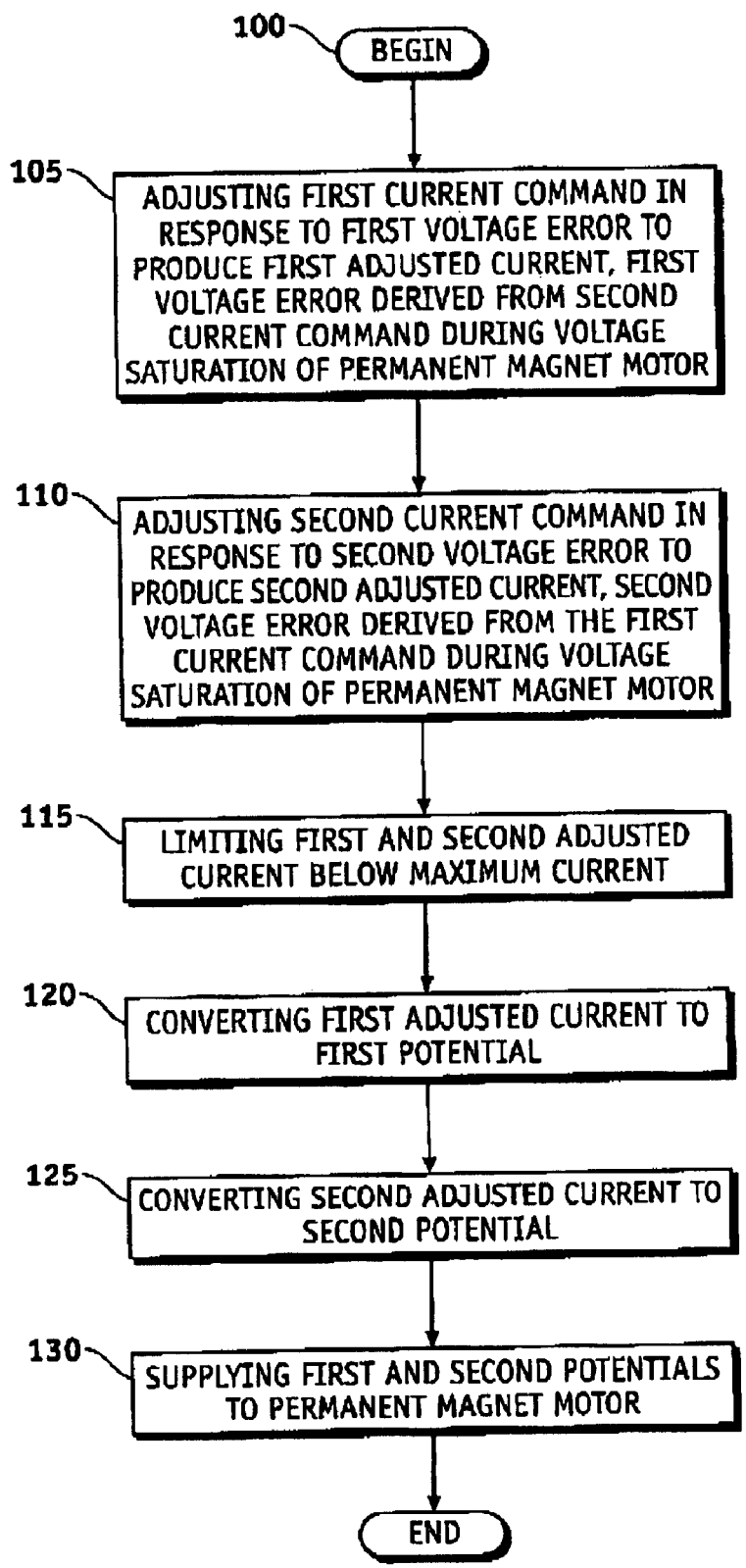
FIG. 6 is a flow diagram of a method for controlling a permanent magnet motor in accordance with an exemplary embodiment of the present invention.

FIG. 6 is a flow diagram of a method 100 for controlling a permanent magnet motor in accordance with an exemplary embodiment of the present invention. A first current command (e.g., $i^{r*}_{ds}$) is adjusted in response to a first voltage error (e.g., $v^{r*}_{qs} - v^{r}_{qs}$) to produce a first adjusted current at step 105. The first voltage error is derived from a second current command (e.g., $i^{r*}_{qs}$) during a voltage saturation of the permanent magnet motor. In one exemplary embodiment, the permanent magnet motor has a voltage limitation due to a DC link voltage of an inverter operating with the permanent magnet motor. Prior to the step 105, the first voltage command is produced from the second current command, and the first voltage error is determined from the first voltage command and the maximum voltage. In another exemplary embodiment, a correction factor $\omega_r L_s (v^{r*}_{qs} - v^{r*}_{qs})$ is determined, the correction factor is low pass filtered to produce a filtered value, a predetermined control gain is applied to the filtered value to produce a current adjustment, and the current adjustment is subtracted from the first current command to produce the first adjusted current. The second current command is adjusted in response to a second voltage error (e.g., $v^{r*}_{ds} - v^{r}_{ds}$) to produce a second adjusted current at step 110. The second voltage error is derived from the first current command during the voltage saturation of the permanent magnet motor. In one exemplary embodiment, a correction factor $\omega_r L_s (v^{r*}_{ds} - v^{r*}_{ds})$ is determined, the correction factor is band pass filtered to produce a filtered value, a predetermined control gain is applied to the filtered value to produce a current adjustment, and the current adjustment is subtracted from the second command current to produce the second adjusted current. In another exemplary embodiment, the step 110 is omitted. Each of the first adjusted current and the second adjusted current is limited below a maximum current at step 115. For example, the first adjusted current is limited between a first predetermined minimum current (e.g., $-i^{r*}_{ds\_m}$) and zero to produce a first limited current reference ($i^{r*}_{ds\_m}$), and the second adjusted current is limited between $$\sqrt{I^2_{s\_max} - (i^{r*}_{ds\_m})^2} \text{ and } -\sqrt{I^2_{s\_max} - (i^{r*}_{ds\_m})^2},$$

wherein $I_{s\_max}$ is the maximum current. The first adjusted current is converted to a first potential (e.g., $v^s_{ds}$) at step 120. The second adjusted current is converted to a second potential (e.g., $v^s_{qs}$) at step 125. The first and second potentials are supplied to the permanent magnet motor at step 130. The method may further comprise converting the first adjusted current to a first voltage reference command (e.g., $v^{r*}_{ds}$), converting the second adjusted current to a second voltage reference command (e.g., $v^{r*}_{qs}$), and limited each of the first and second voltage reference commands to the maximum voltage of the permanent magnet motor.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of element without departing from the scope of the invention as set forth in the appended claims and the legal equivalents thereof.

What is claimed is:

1. A method for controlling a permanent magnet motor, the method comprising the steps of:
    adjusting a first current command in response to a voltage error to produce a first adjusted current, the voltage error derived from a second current command during a voltage saturation of the permanent magnet motor;
    limiting each of the first adjusted current and the second current command below a maximum current;
    converting the first adjusted current to a first potential;
    converting the second current command to a second potential; and
    supplying the first and second potentials to the permanent magnet motor.

2. A method according to claim 1, wherein said limiting step comprises:
    limiting the first adjusted current below a first current limit; and
    limiting the second current command below a second current limit, the second current limit derived from the first adjusted current and the maximum current.

3. A method according to claim 1, wherein said limiting step comprises:

limiting the first adjusted current to a first predetermined maximum current to produce a first limited current; and
limiting the second current command between $$\sqrt{I_{s\_max}^2 - (i_{ds\_m}^{r*})^2} \text{ and } -\sqrt{I_{s\_max}^2 - (i_{ds\_m}^{r*})^2},$$

wherein $I_{s\_max}$ is a maximum stator current and $i^{r*}_{ds\_m}$ is the first limited current.

4. A method according to claim 1, wherein the permanent magnet motor has a voltage limitation, and wherein said step of adjusting the first current command comprises:
   determining a correction factor $\omega_r L_s(v^{r*}_{qs} - v^{r*}_{qs})$;
   low pass filtering the correction factor to produce a filtered value;
   applying a predetermined control gain to the filtered value to produce a current adjustment; and
   subtracting the current adjustment from the first current command to produce the first adjusted current;
   wherein $\omega_r$ is a rotor speed of the permanent magnet motor, $L_s$ is a machine per phase inductance, $v^{r*}_{qs}$ is a q-axis reference voltage command derived from the second current command, and $v^r_{qs}$ is a q-axis reference voltage derived from an application of the voltage limitation to $v^{r*}_{qs}$.

5. A method according to claim 1, wherein the permanent magnet motor has a voltage limitation, and wherein said step of converting the first adjusted current comprises:
   converting the first adjusted current to a first voltage command; and
   limiting the first voltage command below the maximum potential to produce the first potential.

6. A method according to claim 1, wherein the permanent magnet motor has a voltage limitation, and wherein said step of converting the second current command comprises:
   converting the second current command to a second voltage command; and
   limiting the second voltage command below the maximum potential to produce the second potential.

7. A method according to claim 6, wherein said step of adjusting comprises determining the voltage error from a difference between the second voltage command and the second potential.

8. A method for controlling a permanent magnet motor, the method comprising the steps of:
   adjusting a first current command in response to a first voltage error to produce a first adjusted current, the first voltage error derived from a second current command during a voltage saturation of the permanent magnet motor;
   adjusting the second current command in response to a second voltage error to produce a second adjusted current, the second voltage error derived from the first current command during the voltage saturation of the permanent magnet motor;
   limiting each of the first adjusted current and the second adjusted current below a maximum current;
   converting the first adjusted current to a first potential;
   converting the second adjusted current to a second potential; and
   supplying the first and second potentials to the permanent magnet motor.

9. A method according to claim 8, wherein said limiting step comprises:
   limiting the first adjusted current below a first current limit; and
   limiting the second adjusted current below a second current limit, the second current limit derived from the first current limit and the maximum current.

10. A method according to claim 8, wherein said limiting step comprises:
    limiting the first adjusted current below a first predetermined maximum current to produce a first limited current reference; and
    limiting the second adjusted current between $$\sqrt{I_{s\_max}^2 - (i_{ds\_m}^{r+})^2} \text{ and } -\sqrt{I_{s\_max}^2 - (i_{ds\_m}^{r+})^2},$$

wherein $I_{s\_max}$ is the maximum current and $i^{r*}_{ds\_m}$ is the first limited current reference.

11. A method according to claim 8, wherein the permanent magnet motor has a voltage limitation, and wherein the method further comprises prior to said step of adjusting the first current command:
    producing a first voltage command for the second current command; and
    determining the first voltage error from the first voltage command and the maximum voltage.

12. A method according to claim 8, wherein the permanent magnet motor has a maximum voltage, and wherein said step of adjusting the first current command comprises:
    determining a correction factor $\omega_r L_s(v^{r*}_{qs} - v^r_{qs})$;
    low pass filtering the correction factor to produce a filtered value;
    applying a predetermined control gain to the filtered value to produce a current adjustment; and
    subtracting the current adjustment from the first current command to produce the first adjusted current;
    wherein $\omega_r$ is a rotor speed of the permanent magnet motor, $L_s$ is a machine per phase inductance, $v^{r*}_{qs}$ is a q-axis reference voltage command derived from the second current command, and $v^r_{qs}$ is a q-axis reference voltage derived from the maximum voltage and $v^{r*}_{qs}$.

13. A method according to claim 8, wherein the permanent magnet motor has a maximum voltage, and wherein said step of adjusting the second current command comprises:
    producing a second voltage command from the first current command; and
    determining the second voltage error from the second voltage command and the maximum voltage.

14. A method according to claim 8, wherein the permanent magnet motor has a maximum voltage, and wherein said step of adjusting the second current command comprises:
    determining a correction factor $\omega_r L_s(v^{r*}_{ds} - v^{r*}_{ds})$;
    band pass filtering the correction factor to produce a filtered value;
    applying a predetermined control gain to the filtered value to produce a current adjustment, and
    subtracting the current adjustment from the second command current to produce the second adjusted current;
    wherein $\omega_r$ is a rotor speed of the permanent magnet motor, $L_s$ is a machine per phase inductance, $v^{r*}_{ds}$ is a d-axis reference voltage command derived from the second command current, and $v^r_{ds}$ is a d-axis reference voltage derived from the maximum voltage and $v^{r*}_{ds}$.

15. A method according to claim 8, wherein the permanent magnet motor has a voltage limitation, and wherein the method further comprises:

converting the first adjusted current to a first voltage reference command;

converting the second adjusted current to a second voltage reference command; and limiting each of the first and second voltage reference commands to the maximum voltage.

16. A control system for regulating an input voltage to a permanent magnet motor having a saturation current, the controller comprising:

a first current compensation module configured to:
- subtract a first error from a first current command to produce a first adjusted current; and
- limit said first adjusted current to a first maximum current to produce a first limited current;

a second current compensation module configured to limit a second current command to a second maximum current to produce a second limited current, said second maximum current derived from said first maximum current and said saturation current; and a transformation module coupled to said first and second current compensation modules for converting said first limited current to a first input voltage and for converting said second limited current to a second input voltage, said first error produced while converting said second limited current to said second input voltage.

17. A control system according to claim 16, wherein said first current compensation module comprises:

a low pass filter receiving said first error and producing a filtered signal;

a gain module coupled to said low pass filter for applying a control gain to said filtered signal; and a summer coupled to said amplifier for comparing said first current command with said.

18. A control system according to claim 16, wherein said second current compensation module comprises a summer for adding said second limited current with a second error, said second error produced while converting said first limited current to said first input voltage.

19. A control system according to claim 18, wherein said second current compensation module further comprises:

a band pass filter receiving said second error and producing a filtered signal; and a gain module coupled to said band pass filter for applying a control gain to said filtered signal.

20. A control system according to claim 16, wherein said transformation module comprises a voltage limitation module configured to:

receive first and second voltage commands, said first voltage command derived from said first limited current, said second voltage command derived from said second limited current;

limit said first voltage command to produce said first input voltage, said second error being a difference between said first voltage command and said first input voltage; and limit said second voltage command to produce said second input voltage, said first error being a difference between said second voltage command and said second input voltage.

* * * * *